United States Patent [19]
Blake

[11] Patent Number: 6,050,095
[45] Date of Patent: Apr. 18, 2000

[54] TURBOCHARGER WITH INTEGRATED EXHAUST GAS RECIRCULATION PUMP

[75] Inventor: James Edward Blake, Rancho Palos Verdes, Calif.

[73] Assignee: AlliedSignal Inc., Morristown, N.J.

[21] Appl. No.: 09/376,132

[22] Filed: Aug. 17, 1999

[51] Int. Cl.[7] .................................................. F02M 25/07
[52] U.S. Cl. ............................................................ 60/605.2
[58] Field of Search ............................................ 60/605.2

[56] References Cited

U.S. PATENT DOCUMENTS

| | | | |
|---|---|---|---|
| 5,406,796 | 4/1995 | Hiereth et al. | 60/605.2 |
| 5,937,650 | 8/1999 | Arnold | 60/605.2 |

FOREIGN PATENT DOCUMENTS

| | | | |
|---|---|---|---|
| 4209469 | 4/1993 | Germany | 60/605.2 |

*Primary Examiner*—Michael Koczo
*Attorney, Agent, or Firm*—Felix L. Fischer; Grant T. Langton

[57] ABSTRACT

A turbocharger with integrated Exhaust Gas Recirculation (EGR) employs an EGR pump impeller mounted on a common shaft with the turbocharger compressor and turbine. The EGR pump is housed within an EGR extension in the bearing housing adjacent the compressor housing backplate. The recirculation extension includes an exhaust gas outlet for the pumped EGR and an exhaust gas inlet is incorporated in the backplate adjacent the EGR pump impeller.

4 Claims, 1 Drawing Sheet

6,050,095

TURBOCHARGER WITH INTEGRATED EXHAUST GAS RECIRCULATION PUMP

FIELD OF THE INVENTION

This invention relates generally to the field of turbochargers and internal combustion engine exhaust gas recirculation (EGR) systems for emissions improvement and, more particularly, to a turbocharger including an integral EGR pump.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

EGR is a known method for reducing NOX emissions in internal combustion engines. For effective use, an EGR system must overcome the adverse pressure gradient created by a positive pressure gradient across the engine, which is typical of modem high-efficiency diesel engines in at least a portion of their operating range. A conventional EGR system incorporates a control valve that regulates the amount of exhaust gas that is taken from an engine exhaust manifold and returned to an engine induction system for mixing with the intake air and subsequent combustion. The EGR control valve is an ancillary device that is separate from both the engine and turbocharger. The conventional EGR system also includes a pump, separate from the turbocharger and engine, that increases the pressure of the returned exhaust gas routed by the EGR control valve to the induction system, to match the intake air charge or boost pressure exiting the turbocharger, thereby overcoming the positive pressure gradient across the engine.

Modern engine compartments, especially those of turbocharged internal combustion engines, are configured having minimal space for devices ancillary to the engine itself, thereby making use of such conventional EGR systems, comprising a separate control valve, pump, and exhaust and intake manifold bypasses, and related manifolding and plumbing difficult and sometimes impossible. It is, therefore, desirable that one or more of the devices of an EGR system be constructed as an integral member of an existing component of a turbocharged internal combustion engine, to thereby enable use of an EGR system within the spatial confines of a modern engine compartment. It is also desirable that the component be adapted to incorporate at least one device of an EGR system both without sacrificing performance of the engine component itself, and in a manner that provides enhanced EGR system operation.

DETAILED DESCRIPTION OF THE INVENTION

Figure 1:
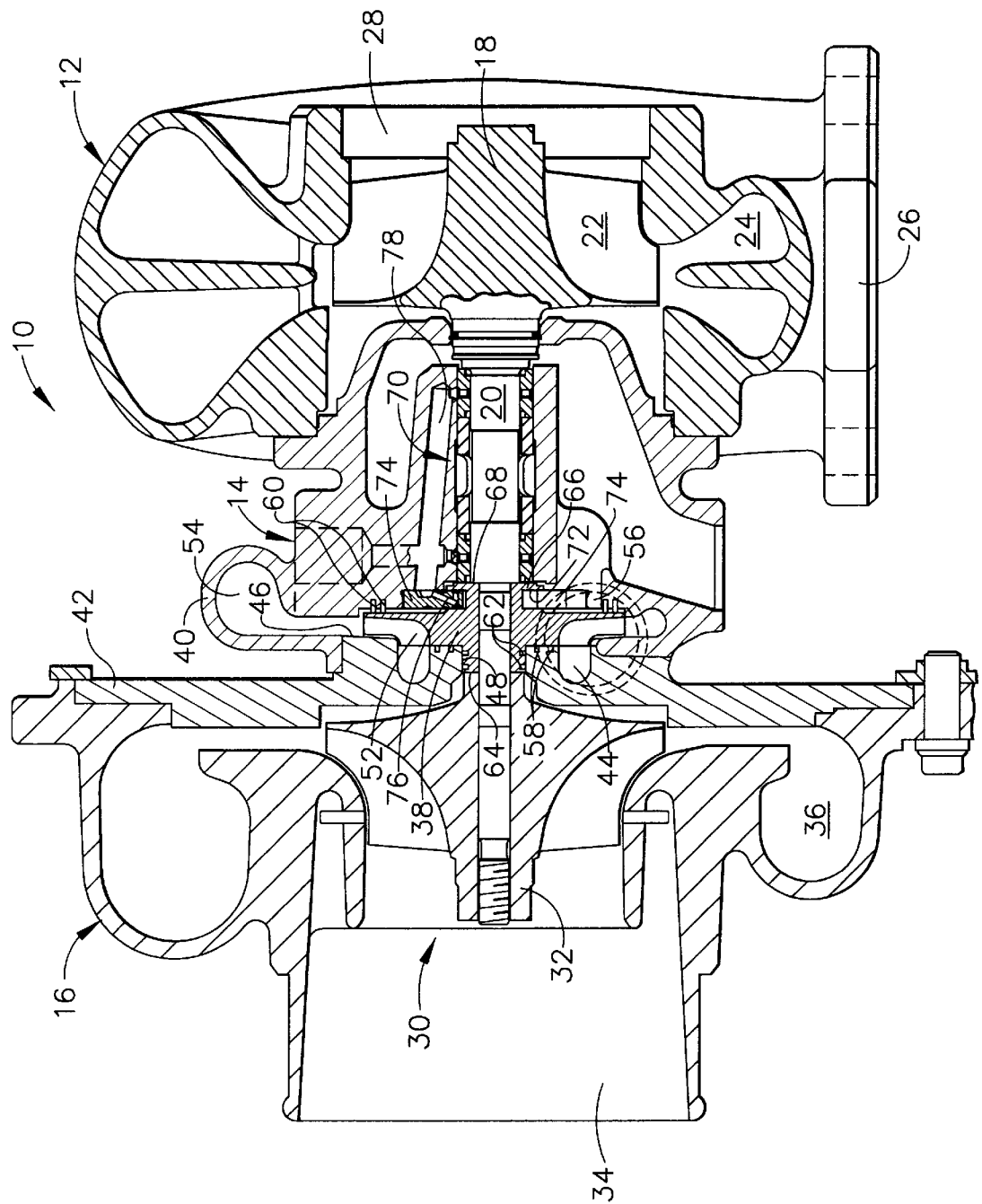
FIG. 1 is a elevational section view of a turbocharger incorporating the present invention.

A turbocharger, constructed according to principles of this invention, includes an EGR pump disposed integrally therein attached to a shaft that is common to a turbocharger compressor impeller and exhaust turbine. The EGR pump is housed between a turbocharger compressor and turbine housing and is put into rotational operation by conventional activation of the turbocharger exhaust turbine to pressurize an exhaust gas side stream for combining with boost air for introduction into an engine intake system.

Referring to the figure, a turbocharger 10, has a turbine housing 12, a shaft or bearing housing 14 attached at one of its sides to the turbine housing, and a compressor housing 16 attached at an opposite side to the turbocharger bearing housing 14. A turbine 18 is disposed within the turbine housing 12 and is attached to one end of a common shaft 20 that extends axially through the turbine, bearing and compressor housings. The turbine 18 includes blades 22 that are designed to receive exhaust gas that is passed from an turbine volute 24 that is in gas flow communication with a turbine housing exhaust gas inlet turbine 26. The exhaust gas passes from the volute 24 across the turbine, causing the turbine and shaft 20 to spin, and exits the turbine housing via an exhaust gas outlet 28.

At an opposite end of the turbocharger 10, a compressor 30 is disposed within the compressor housing 16. The compressor includes an impeller 32 attached to an opposite end of the common shaft 20 that is designed to receive atmospheric air from a compressor housing air intake 34 and increase the pressure of such air by rotational operation. The pressurized air is routed by the compressor into a compressor volute 36, that is in air flow communication with an air outlet (not shown) for passing the pressurized or boosted air to an engine intake system (not shown).

An EGR pump 38 is disposed within the turbocharger between the turbocharger turbine and compressor housings 12 and 16. Specifically, the EGR pump is attached to the common shaft 20 and is positioned within an EGR extension 40 that is a portion of the turbocharger bearing housing 14 adjacent the compressor housing backplate 42. The compressor backplate 42 is attached at one end to the compressor housing 16 by conventional means, and is attached at an opposite end to an end of the bearing housing 14 also by conventional means.

The compressor backplate 42 is designed having an EGR exhaust gas inlet 44 disposed along a backplate surface 38 engaging the bearing housing. In an example embodiment, the EGR exhaust gas inlet is formed within the backplate by casting method. The EGR exhaust gas inlet 44 extends concentrically around a central opening 48 through the backplate to accommodate passage of the common shaft 20 therethrough. The EGR exhaust gas inlet 44 is in communication with an EGR exhaust gas passage that extends radially outwardly away from an outside surface of the compressor backplate 42, and that is attached to an EGR exhaust gas source, e.g., an exhaust gas side stream from the exhaust gas supply routed to the turbine housing.

EGR exhaust gas that enters the EGR exhaust gas inlet 44 passes to an EGR impeller 52, where the entering exhaust gas is pressurized by the rotational action of the EGR impeller and is passed radially within the EGR extension 40 to an EGR outlet exhaust gas volute 54 that is formed within a portion of the turbocharger bearing housing 14 adjacent the compressor backplate 42. In an example embodiment, the EGR outlet exhaust gas volute is formed within the bearing housing by casting method. An EGR exhaust gas outlet 56 is in communication with the EGR exhaust gas volute 54 and is designed to accommodate attachment with conventional tubing and the like for routing the pressurized exhaust gas for mixing with boosted intake air and introduction into the engine intake system.

The EGR extension 40 includes a first set of axial seals 58 that are disposed along the compressor backplate surface 46 and that are positioned concentrically around the central opening 48. The first set of axial seals 58 are in the form of channels that are designed to minimize/eliminate the passage of gas radially inwardly across an adjacent axially-facing surface of the EGR impeller 38 towards the central opening 48. The EGR extension 40 also includes a second set of axial seals 60 disposed along an axially-facing surface of the turbocharger bearing housing 14. The second set of axial seals 60 serve to minimize/eliminate the passage of gas radially inwardly across an adjacent axially-facing surface of the EGR impeller 38 towards the central opening 48. The number of channels that are used to make up each first and second set of axial seals can vary depending on the particular turbocharger application. However, for purposes of providing sufficient sealing capacity it is desired that each first and second set of axial seals comprise at least two concentrically arranged channels.

The EGR extension 40 includes a set of radial seals 62 that are positioned within the backplate central opening 48. The radial seals 62 are used to minimize/eliminate the passage of exhaust gas from the EGR extension 40 axially towards the compressor housing 16. In an example embodiment, the set of radial seals 62 is in the form of two piston rings that are positioned axially adjacent one another within complementary grooves formed within the hub 38. The set of radial seals form a leak-tight seal against an adjacent axial portion of the EGR impeller hub to prevent the passage of exhaust gas to the compressor housing, thereby preventing corrosion-related damage and unwanted heating of the boost air.

The EGR impeller hub 38 is designed having a first axial end 64 that is sized having a diameter that complements an adjacent axial end of the compressor 32. The EGR impeller is designed having a thrust collar 66 at its opposite axial end formed from a radially extending section of the hub. The EGR impeller thrust collar 66 has a first axially-directed surface 68 that is positioned against an adjacent common shaft bearing assembly 70, and a second axially-directed surface 72 that is positioned against an adjacent thrust washer 74. In an example embodiment, the thrust washer 74 has a C-shaped configuration to facilitate assembly of the EGR impeller within the EGR extension. The thrust washer 74 includes one or more lubrication passages 76 that extend therethrough for routing lubrication from a main lubrication port 78 within the bearing housing 14 to an EGR turbine axial surface.

A key feature of turbochargers constructed according to the principles of this invention is the construction and placement of an EGR impeller within the turbocharger bearing housing itself, i.e., as an integral member of the turbocharger, rather than as a member that is ancillary to and independent of the turbocharger. The integral design of the EGR impeller avoids the need to use an ancillary EGR pump, thereby maximizing the spatial efficiency of the turbocharger within an engine compartment. The integral design of the EGR turbine also improves engine operating efficiency by avoids the need to power an ancillary EGR pump from the engine crankshaft or the like. Additionally, turbochargers of this invention incorporate the integral placement of the EGR turbine therein without sacrificing or otherwise adversely impacting the operation or service life of the turbocharger itself.

Having now described the invention in detail as required by the patent statutes, those skilled in the art will recognize modifications and substitutions to the specific embodiments disclosed herein. Such modifications are within the scope and intent of the present invention.

What is claimed is:

1. A turbocharger for internal combustion engines comprising:

a turbine housing comprising an exhaust gas inlet, and exhaust gas outlet, and an exhaust gas turbine rotatably disposed therein, wherein the exhaust gas turbine is attached to a shaft extending axially through the turbine housing;

a center housing attached to the turbine housing, wherein the shaft extends axially through the center housing, and wherein the center housing includes a bearing portion assembly for supporting the shaft;

a compressor housing attached to an end of the center housing opposite the turbine housing, wherein the compressor housing includes a compressor backplate that is directly attached to the center housing and interposed between the center and compressor housings, wherein the compressor housing includes an air intake inlet, a pressurized air outlet, and a compressor impeller rotatably disposed therein and attached to an end of the shaft opposite the exhaust gas turbine;

the center housing further including an exhaust gas recirculation extension interposed between the compressor and turbine housings, wherein the exhaust gas recirculation extension is intermediate the compressor backplate and the bearing portion of the center housing; wherein the exhaust gas recirculation extension has an exhaust gas outlet for passing pressurized exhaust gas therethrough, and an exhaust gas recirculation impeller rotatably disposed therein and attached to the shaft for pressurizing entering exhaust gas;

a means for receiving exhaust gas operably adjacent to the exhaust gas recirculation impeller; and means for preventing the escape of exhaust gas from the exhaust gas recirculation extension to the compressor housing.

2. A turbocharger for internal combustion engines as defined in claim 1 wherein the means for receiving exhaust gas includes a channel in the backplate concentric to the shaft and immediately adjacent the exhaust gas recirculation impeller.

3. A turbocharger for internal combustion engines as defined in claim 1 wherein the exhaust gas recirculation impeller includes a hub extending through an aperture in the backplate, concentric to the shaft, and the means for preventing escape of exhaust gas comprises at least one radial seal on the hub of the exhaust gas recirculation impeller engaging the backplate within the aperture intermediate the exhaust gas recirculation impeller and the compressor impeller.

4. A turbocharger for internal combustion engines as defined in claim 1 wherein the means for preventing escape of exhaust gas comprises at least one axial seal concentric to the shaft and operably engaging the exhaust gas recirculation impeller and the backplate.

* * * * *